Inventor:
Dallas E. Cain,
by Paul A. Frank
His Attorney.

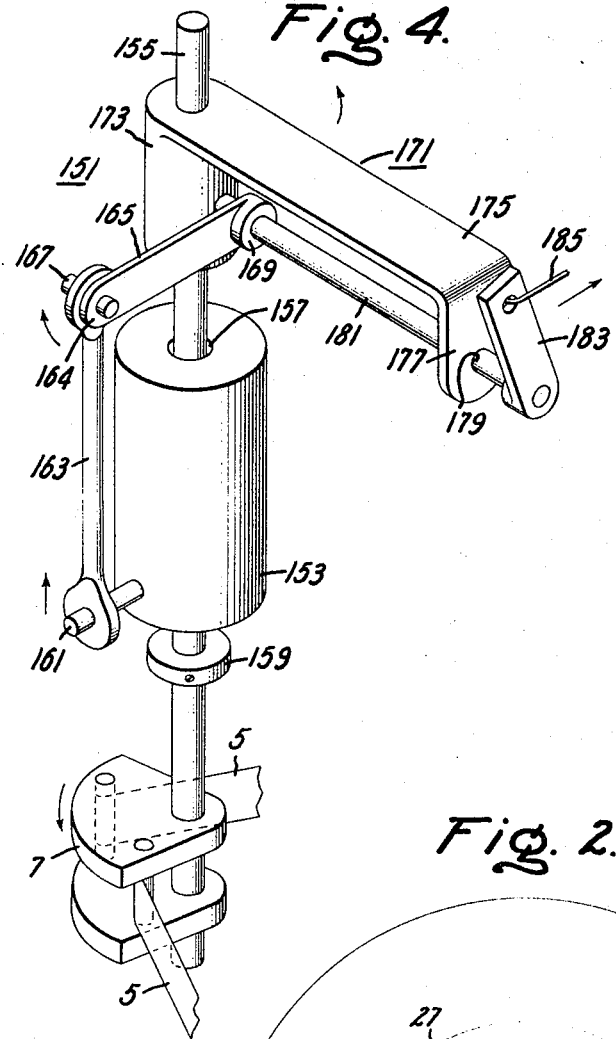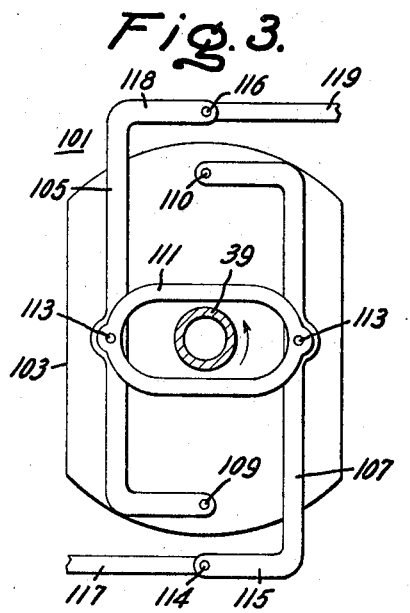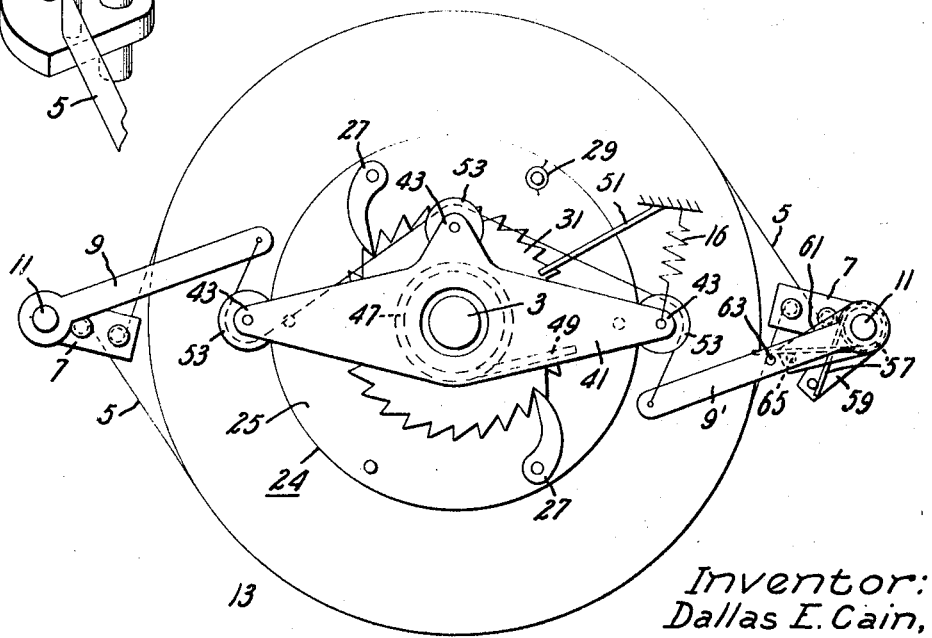

United States Patent Office 3,452,840
Patented July 1, 1969

3,452,840
ONE-WAY BRAKE SYSTEM
Dallas E. Cain, Scotia, N.Y., assignor to General Electric Company, a corporation of New York
Filed Sept. 20, 1967, Ser. No. 669,186
Int. Cl. F16d 51/00, 63/00
U.S. Cl. 188—77                          20 Claims

ABSTRACT OF THE DISCLOSURE

A brake system for a reversely rotatable shaft is provided so that the shaft will not rotate in a reverse direction. The main brake consists of two conventional brake bands engageable with a flywheel carried by the shaft, self-energizing actuation linkages and actuation levers therefor. When the shaft begins to reversely rotate, a pawl is caused to fall into a ratchet. The reversely rotating ratchet is clutched to a pulley lever assembly which operates the main brake to pull the two brake bands into braking contact with the flywheel. The clutch means is so constructed that, upon rotation of the shaft beyond a predetermined arc in the reverse direction, the clutch means is actuated to permit unlimited reverse rotation of the shaft concurrently while maintaining the engagement of the brakes, thereby preventing any damage to the brake system. When the shaft begins to rotate in a forward direction again, the brake and pawl and ratchet both release to allow for free rotation.

---

The present invention relates to brake systems and, more particularly, to a novel one-way brake system.

In many systems, it is desirable to provide a shaft which is rotatable in only one direction. A brake system is, therefore, necessary to prevent shaft rotation in the opposite direction. In some applications, however, an especially large torque is developed tending to rotate the shaft in the undesired direction. An example of such a situation is a large centrifugal pump which is driven by a large AC motor in a forward direction. When the pump motor is de-energized a water head may appear across the pump which tends to drive the pump shaft in a reverse direction with great force. Therefore, a powerful brake mechanism is necessary to prevent reverse rotation of the shaft when the motor is de-energized.

Furthermore, in some applications, it becomes necessary to include an overload feature for the brake to prevent damage thereto should the shaft not come to a halt as expected. Such an overload feature should not affect the integrity of the brake when operating in the normal operating range, but should be quite effective when an overload actually results.

It is, therefore, an object of this invention to provide a novel one-way brake system.

It is another object of this invention to provide a one-way brake system including an effective overload feature to prevent damage to the brake.

In accordance with my invention in one form thereof, I provide a one-way brake system for a shaft rotatable in forward and reverse directions. A main brake is provided engageable with the shaft for stopping rotation thereof. A pawl and ratchet assembly is provided to couple the shaft with the main brake when the shaft rotates in a reverse direction. The ratchet and the brake means are operably connected by means of a clutch member which normally engages the ratchet with the brake means. The clutch member is actuated to allow unlimited motion of the ratchet when the system is overloaded.

Other objects and advantages of the present invention may better be understood by reference to the following detailed description when taken in connection with the accompanying drawing in which:

FIGURE 2 is a top view of the brake system of the present invention just after the shaft has begun to reverse;

FIGURE 3 is a top view of a modification of the present invention wherein a linkage arrangement is utilized to achieve braking equalization; and FIGURE 4 is a perspective view of a modification of the brake means for the present invention wherein weights are utilized for predetermining the brake effort.

Figure 1:
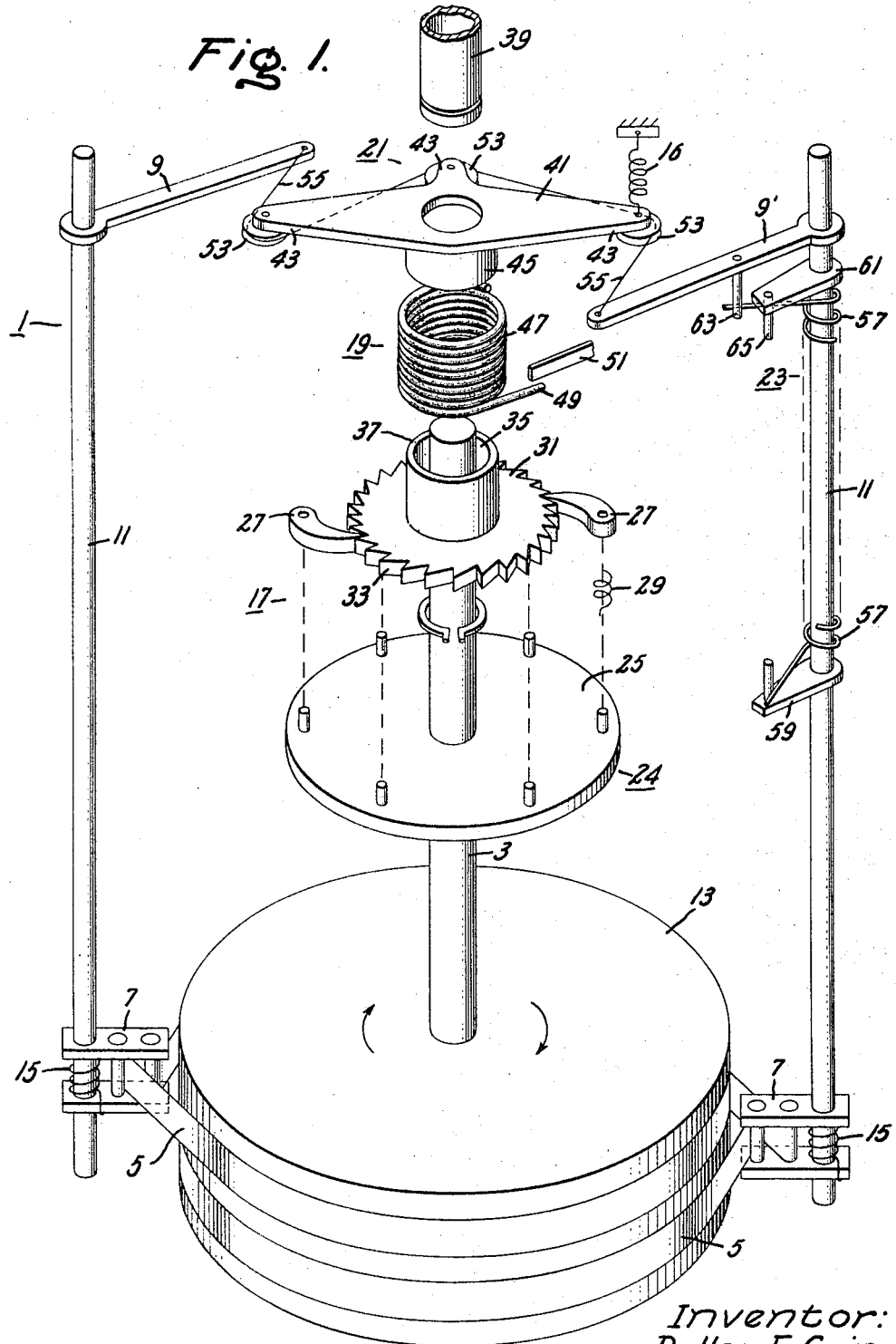
FIGURE 1 is an exploded view of a preferred form of the brake system of the present invention.

In FIGURE 1 there is shown a brake system 1 for application to a reversely rotatable shaft 3. A suitable motor (not shown) is provided to drive the shaft 3. When the motor is energized, the shaft rotates in a forward direction, as shown by the arrows in FIGURE 1. In certain applications, such as when the motor is used to drive a large centrifugal pump, if the motor loses power, a water head across the pump may cause the pump to reverse, thereby reversing the rotation of the shaft 3. The brake system 1 is provided to prohibit such reverse shaft rotation when this occurs.

The brake system 1 includes two conventional brake bands 5, 5 and brake actuation means including self-energizing actuation linkages 7, 7 and brake actuation levers 9, 9 operatively connected to the actuation linkages 7, 7 through rotatable brake actuation shafts 11, 11. Two bands may be used to avoid major side loading to the bearings of the shaft of a motor-pump system, for example. Not shown are restraining means to hold the bands concentric with the surface of a brake drum or flywheel 13 mounted on the shaft 3, when the bands 5, 5 are in the expanded or released condition. The bands are slightly spring-loaded into the expanded condition by small spring 15, 15.

The brake system also includes a combination of components listed below in the sequence in which they function upon application of the brakes: (a) a ratchet wheel and pawl assembly 17; (b) clutch means 19 that operatively connects the ratchet wheel and pawl assembly 17 to the actuating levers 9, 9; (c) equalizing means 21 to distribute the braking force between the brake bands 5, 5; and (d) overtravel preventive means 23 to predetermine the maximum braking effort.

More specifically, the ratchet wheel and pawl assembly 17 includes a rotatable pawl carrier 24 mounted near the free end of the shaft 3 for rotation therewith. The pawl carrier 24 comprises a flat circularly shaped disc including an upper surface 25 upon which are mounted a series of pivotal pawl members 27. The elongated pawls 27 are biased toward the center of the pawl carrier 23 by suitable spring means 29. A ratchet wheel 31 comprising a generally flat circular disc member is in juxtaposition with the upper surface 25 of the pawl carrier 23 and includes tooth portions 33 around the periphery thereof. The ratchet wheel 31 includes a central aperture 35 and an annular flange portion 37 which surrounds the aperture 35 and projects upwardly from the ratchet wheel disc. An extension of shaft 3 extends through aperture 35 of ratchet wheel 31. A pulley lever member 41 is provided including outwardly extending arm portions 43 and including a hollow central cylindrical flange member 45 having a diameter equal to the diameter of flange 37 of the ratchet wheel. Flange member 45 is adapted to receive the end of the extended shaft portion 39. The flange members 37 and 45 are axially aligned about the shaft portion 39.

Clutch means 19 are provided in the form of a helical spring clutch 47 which surrounds the exterior of annular flange portion 37 of ratchet wheel 31 and flange portion 45 of pulley lever 41. Spring 47 is sufficiently taut around these flange portions to positively lock ratchet wheel 31 and pulley lever 41 for reverse rotary motion. Spring clutch 47 includes a tab portion or tang 49 which may engage a fixed stop 51 to decouple ratchet wheel 31 from pulley lever 41 after the ratchet wheel has rotated through a predetermined arc. The operation of spring clutch 47, and its cooperation with stop member 51, are discussed more fully below.

Pulley lever 41 includes means for operative connection thereof to brake levers 9, 9. In a preferred form, a series of three spaced pulleys 53 are rotatably mounted at the end of each of arm portions 43 of pulley lever 41. A fixed-length cable 55 is threaded through pulleys 53, as seen in FIGURES 1 and 2, for operatively connecting pulley lever 41 to brake bands 5, 5. The ends of cable 55 are connected, respectively, to brake lever members 9, 9', each of which is fixed at one end of a brake actuation shaft 11 for rotation therewith. Each brake actuation shaft 11 is operatively connected to the self-energizing actuation linkage member 7. A function of the cooperating pulley lever 41 and cable 55 is to equally distribute the braking effort between the two brake bands 5, 5, so as to minimize major side loading to the bearings of the shaft in system. Spring 16 is the return spring for pulley lever 41.

The operation of the brake system will now be described: At normal operating speed, when shaft 3 is rotating in a forward direction, pawls 27 on pawl carrier 23 are centrifugally disengaged from ratchet wheel 31, and no part of brake system 1 is in effective contact with shaft 3. After loss of power to the motor, shaft 3 loses speed rapidly if a reverse torque is applied thereto, as by a reverse torque developed by a water head across a centrifugal pump, for example. At such a low speed, the pawls 27 leave their stop positions, become spring-loaded against the ratchet wheel 31, and ratchet over the teeth of wheel 31 until the speed of shaft 3 decreases to zero. As shaft 3 begins to reverse, as under a reverse torque developed and applied to the shaft, pawls 27 engage ratchet wheel 31, as shown in FIGURE 2, to carry the ratchet wheel in the reverse direction. Rotation of ratchet wheel 31 causes rotation of pulley-lever assembly 21, spring clutch 47, at this point, positively locking ratchet wheel 31 with pulley lever 41. Rotation of pulley lever 41 and cable 55 causes movement of brake levers 9, 9' to rotate brake actuation shafts 11, 11 and bring brake bands 5, 5 into contact with flywheel 13 to stop shaft 3 from further rotation.

As described above, cable 55 and pulley lever 41 cooperate to provide an equalizing function. The first brake band, such as the lower band in FIGURE 1, for example, to contact flywheel 13 produces a resistance to movement of the brake lever 9 associated therewith, whereupon this lever 9 will provide more resistance to movement or stop completely. Such action of brake lever 9 causes the fixed length of cable 55 to move through pulleys 53, thereby bringing the lefthand lever 9 up at an accelerated rate and accelerating the engagement of the associated brake bands with flywheel 13. Subsequent motion of the pulley lever applies "full" torque equally to both brake levers.

The torque at which the brakes may be applied must be predetermined. In FIGURE 1, the means for predetermining the brake effort is the initial torsional windup of overtravel spring 57 which is coiled about actuation lever 11. The lower end of spring 57 bears against the pin in member 59 fixed to shaft 11 for rotation therewith. The upper end of spring 57 bears against the pin 65 in member 61 mounted on the brake actuation shaft 11 and freely rotatable with respect thereto. Brake lever 9' which is freely mounted on the shaft 11, includes a downwardly extending pin 63 which is adapted to engage an extension of spring 57 beyond pin 65 mounted on the freely rotatable member 61. As each brake lever 9 is rotated through a small arc by operation of the pulley lever and cable arrangement 21, rotatable member 61 is caused to rotate through a small arc to operate brake bands 5, member 61, overtravel spring 57, member 59 and shaft 11 appearing as a rigid member, until the torque transmitted to the brake lever overcomes the countertorque provided by the overtravel spring, whereupon further movement of the brake lever 9 coils the spring so that further motion is transmitted to shaft 11. Thus, the overtravel spring torque governs and limits the torque applied to the brakes and causes brakes to be applied at a predetermined torque value.

The maximum torque-determining means may comprise other spring types of mechanisms which permit overtravel movement of pulley lever 41 while maintaining loading on brake levers 9. For example, a connecting member may be provided between each brake lever 9 and lever 41 which includes pre-stressed Negator springs to determine the maximum torque at which the brake is set. As in the torque-determining arrangement shown in FIGURE 1, after a predetermined torque is built up on lever 41, further rotation of the brake actuation shaft is terminated although lever 41 is free to overtravel. Using two spring arrangements with differing springs provides for predetermining two levels of braking torque.

As was mentioned previously, it has been found convenient to incorporate into the system a provision to prevent damage thereto should the shaft not come to a halt as expected. This overload preventive means 19 is provided by spring clutch 47 which prevents pulley lever 41 from being rotated beyond a predetermined extreme position. One end of clutch spring 47, or the input end, is bent to a radial position so as to form a tang 49 which engages the fixed stop 51 in a predetermined extreme position, which is well beyond the normal operating range of the brakes. Upon engagement of stop 51 by tang 49, spring 47 uncoils enough to semi-uncouple pulley lever 41 from ratchet wheel 31, preventing further advance of pulley lever 41; however, enough torque is still supplied to maintain the cable loading. The cable 55 in this extreme position is moved into position having a small effective radius from the center of the pulley lever, thus minimizing the slip-torque load on the spring clutch.

A modification of the brake system of the present invention is shown in FIGURE 3 wherein the equalizing function provided by the cable and pulleys is provided by an arrangement of equalizing links 101 carried by clutch output flange 103. In such an arrangement a pair of U-shaped equalizing links, designated left-hand link 105 and right-hand link 107, supported on stationary support extension 39 are provided, the links being pivotally mounted on clutch output flange 103 by means of pins 109 and 110 or suitable members. The equalizing links 105 and 107 are operatively associated with each other by a looped link 111 which is mounted on pins 113, 113 carried by the equalizing links at a central portion thereof and serves to operatively connect the two links. The free arms 115 and 118 of the two links are attached by means of pins 114 and 116 to the associated brake levers 117 and 119 so that ratchet wheel 31 is operatively connected to the main brake. Assuming that upon engagement of the pawl with the ratchet wheel, the ratchet wheel and clutch output flange 103 are caused to rotate in a direction shown by the arrow in FIGURE 3, one of the links, such as right-hand link 107, will move and cause the associated brake lever 117 to rotate, thereby allowing one of the two brake bands associated therewith to first contact the flywheel. Such contact with the flywheel will produce a resistance to lever 117 whereupon this lever will stop. The pin 114 connecting right-hand link 107 with brake lever 117 then becomes the fixed pivot point and the other end of equalizing line 107 moves with the still-rotating clutch output flange 103. The other left-hand link 105 continues to move about its pivot point 109, and added impetus to link movement is provided by movement of right-hand link 107 through looped link 111, which moves to the left as viewed in FIGURE 2. This serves to accelerate the rate at which the other brake band contacts the flywheel.

FIGURE 4 depicts an alternative arrangement for predetermining the maximum brake effort. A weight arrangement 151 is provided wherein a weight 153 is supported by each brake actuation shaft 155. The weight 153 comprises a generally cylindrical body including a central aperture 157 through which actuation shaft 155 extends. A stop portion 159 is provided underneath weight 153 to restrain downward movement thereof. The weight 153 includes an outwardly extending pin 161 which receives an upwardly extending link member 163. The link member 163 is pivotally connected to one end 164 of a second link member 165 by means of a suitable pivot pin 167. The other end 169 of link 165 is connected to a lever-like arrangement 171 comprising a cylindrical member 173 fixed to brake actuation shaft 155 for rotation therewith. A plate member 175 extends outwardly from cylindrical member 173 and includes a downwardly extending flange portion 177 including a central aperture 179 for supporting a rotatably mounted rod 181 extending outwardly from cylindrical member 173. A free end portion of rod 181 includes a tab member 183 fixed for rotation therewith. The free end of tab member 183 is connected to a suitable coupling or connector, such as the end of cable 185 in the pulley lever and cable arrangement of FIGURE 1. The overtravel arrangement operates as follows: When the ratchet wheel drives the pulley lever, the pulley lever pulls cable 185 in a direction shown by the arrow in FIGURE 4. Such movement causes brake actuation shaft 155 to rotate, tab 183 and associated rod 181 appearing as a rigid member equivalent to the brake lever, due to the countertorque supplied by weight 153. When the brake lever stops, continued motion of the pulley member overcomes the counter-torque of weight 153 and pulls tab 185, thereby rotating extension rod 181. Rotation of extension rod 181 causes the other end 164 of link 165 to be raised upwardly, thereby drawing upwardly the first link member 163, and resulting in raising weight 153. Rotary movement of brake actuation shaft 155, then, does not take place after sufficient torque has been achieved to overcome the torque required to raise weight 153. Thus, the torque level at which the brake operates is predetermined. Using two weight arrangements with differing weights provides for two levels of braking torque.

I have thus described a brake system for stopping a rotatable shaft wherein a pawl and ratchet wheel assembly is utilized to couple the rotating shaft with the brake mechanism when the shaft rotates in a reverse direction. The brake mechanism comprises multiple self-energizing brake bands and actuation means therefor which is operatively engaged with the pawl and ratchet wheel assembly. Brake effort equalizing means may be provided so that the braking effort is distributed approximately equally between the brake bands. Furthermore, means are provided so that the braking effort may be predetermined at particular torque levels. Finally, a spring clutch arrangement is provided to decouple the pawl and ratchet wheel assembly with the brake actuating arrangement so that the system may be prevented from being permanently damaged should the shaft not come to a halt as anticipated.

What I claim as new and desire to secure by Letters Patent of the United States is:

1. A one-way brake system for a shaft rotatable in forward and reverse directions comprising
   brake means engageable with the shaft for stopping rotation thereof comprising self-energizing brake bands engageable with the rotatable shaft,
   brake actuation means comprising actuation linkages to each of which the ends of a brake band are connected, and rotatable brake actuation shaft means for operating each of said actuation linkages to engage said brake bands with the rotatable shaft, and
   pawl and ratchet wheel means responsive to rotation of the rotatable shaft and operatively connected to said brake actuation means for stopping rotation of the rotatable shaft in a reverse direction.

2. The one-way brake system as recited in claim 1 wherein said pawl and ratchet wheel assembly comprises
   a rotary pawl carrier mounted on the rotatable shaft,
   at least one pawl pivotally mounted on said pawl carrier, and
   a ratchet wheel juxtaposed with said pawl carrier and being drivingly engaged by said pawl when the shaft is rotated in a reverse direction.

3. The device as recited in claim 1 wherein said brake actuation means includes means for determining the braking torque applied by said brake bands.

4. The device as recited in claim 3 wherein said brake torque determining means comprises spring means for providing reference forces.

5. The device as recited in claim 4 wherein said spring means compriess helical springs surrounding each of said brake actuation shafts, each of said springs being secured to said shafts at one end thereof, the other end of said spring being connected to a member pivotally supported on said shaft, said brake lever operating on said rotatable member to rotate said brake actuation shafts until the torque exerted by said spring is overcome.

6. The device as recited in claim 3 wherein said brake torque determining means comprises weights for providing reference forces.

7. The device as recited in claim 3 wherein said brake torque determining means for each brake band includes a weight slidingly supported by said brake actuation shaft, a portion on said brake lever movable relative thereto, a connecting linkage for connecting and weight to said movable portion of said brake lever, and the connecting linkage of said weight with said brake lever preventing movement of said movable member due to the countertorque provided by said weight so that rotary movement of said ratchet wheel is transmitted to said brake actuation shaft until the resisting torque developed by said actuation shaft builds up to the torque provided by said weight whereupon the movable member on said brake lever is raised and said brake actuation shaft no longer rotates.

8. The device as recited in claim 3 wherein clutch means are provided normally engaging said ratchet wheel with said brake actuation means when the shaft is rotated beyond a predetermined arc in a reverse direction.

9. The device as recited in claim 1 wherein said brake actuation means includes means for equalizing the braking forces of the brake bands.

10. The device as recited in claim 9 wherein said equalizing means comprises an elongated member mounted for rotation with said ratchet wheel, a series of pulleys rotatably mounted on said elongated member, and a cable threaded through said pulleys, the ends of said cable being connected to said brake levers.

11. The device as recited in claim 9 wherein said equalizing means comprises an elongated member mounted for rotation with said ratchet wheel, a pair of link members, each of said link members being pivotally mounted at one end thereof on said elongated member and connected to a brake lever at the other end thereof, and a third link member for connecting said two link members together.

12. The device as recited in claim 9 wherein clutch means are provided normally engaging said ratchet wheel with said brake actuation means, said clutch means disengaging said ratchet wheel and said brake actuation means when the shaft is rotated beyond a predetermined arc in a reverse direction.

13. The device as recited in claim 9 wherein said brake actuation means includes means for determining the braking torque applied by said brake bands.

14. The device as recited in claim 13 wherein clutch means are provided normally engaging said ratchet wheel with said brake actuation means, said clutch means disengaging said ratchet wheel and said brake actuation means when said ratchet wheel is rotated in a reverse direction beyond a predetermined arc.

15. The device as recited in claim 14 wherein said pawl and ratchet wheel assembly comprises a rotary pawl carrier adapted to be mounted on the rotatable shaft, at least one pawl pivotally mounted on said pawl carrier, and a ratchet wheel juxtaposed with said pawl carrier and being drivingly engaged by said pawl when the shaft is rotated in a reverse direction, said ratchet wheel including an annular flange portion, and wherein said clutch means comprises a clutch plate operatively connected to said brake actuating means and including an annular flange portion, said annular flange portion of said ratchet wheel and said clutch plate being axially aligned, and a helical spring clutch surrounding said flange members and normally locking them together for rotation, said spring clutch including a tang portion which abuts a fixed stop member to uncoil said spring when said ratchet wheel rotates beyond a predetermined arc.

16. The device as recited in claim 15 wherein said equalizing means comprises a pair of link members, each of said link members being pivotally mounted at one end thereof on said clutch plate and connected to a brake lever at the other end thereof, and a third link member for connecting said two link members together.

17. The device as recited in claim 13 wherein said brake torque determining means comprises weights for providing reference forces.

18. The device as recited in claim 15 wherein said braking torque determining means for each brake band includes a weight slidingly supported by said brake actuation shaft, a portion on said brake lever movable relative thereto, a connecting linkage for connecting said weight to said movable portion of said brake lever, and the connecting linkage of said weight with said brake lever preventing movement of said movable member due to the countertorque provided by said weight so that rotary movement of said ratchet wheel is transmitted to said brake actuation shaft until the torque developed by said ratchet wheel overcomes the torque provided by said weight whereupon the movable member on said brake lever is released and said brake actuation shaft no longer rotates.

19. A one-way brake system for a shaft rotatable in forward and reverse directions comprising
brake means engageable with the shaft for stopping rotation thereof,
means for actuating said brake means,
pawl and ratchet wheel means responsive to rotation of the shaft for operating said brake means, and
clutch means normally engaging said ratchet wheel with said brake actuation means, said clutch means disengaging said ratchet wheel and said brake actuation means when the shaft is rotated beyond a predetermined arc in said reverse direction.

20. The device as recited in claim 19 wherein said clutch means includes a clutch plate operatively connected to said brake actuating means and including an annular flange member, said ratchet wheel including an annular flange member, said annular flange members of said ratchet wheel and said clutch plate being axially aligned, and a helical spring clutch surrounding said flange members and normally locking them together for rotation, said spring clutch including a tang portion which abuts a fixed stop member to uncoil said spring clutch when said ratchet wheel rotates beyond a predetermined arc.

References Cited
UNITED STATES PATENTS

| | | | |
|---|---|---|---|
| 2,341,753 | 2/1944 | Zwald | 188—82.77 |
| 2,844,225 | 7/1958 | Hubbard et al. | 188—82.77 X |

FOREIGN PATENTS

| | | |
|---|---|---|
| 391,316 | 4/1933 | Great Britain. |

DUANE A. REGER, *Primary Examiner.*

U.S. Cl. X.R.

188—82.77